(12) United States Patent
Yang et al.

(10) Patent No.: US 7,549,446 B2
(45) Date of Patent: Jun. 23, 2009

(54) MULTI-FUNCTIONAL FLOW CONTROL VALVE FOR WATER TREATMENT SYSTEMS

(75) Inventors: Runde Yang, No. 1, LongFang Ind. Zone, Nanjiao, Wenzhou (CN) 325029; Xiaorong Wu, Wenzhou (CN); Fengyang Ding, Wenzhou (CN)

(73) Assignee: Runde Yang, Wenzhou (CN)

( * ) Notice: Subject to any disclaimer, the term of this patent is extended or adjusted under 35 U.S.C. 154(b) by 299 days.

(21) Appl. No.: 10/579,126

(22) PCT Filed: Mar. 18, 2005

(86) PCT No.: PCT/CN2005/000343

§ 371 (c)(1),
(2), (4) Date: May 12, 2006

(87) PCT Pub. No.: WO2006/007772

PCT Pub. Date: Jan. 26, 2006

(65) Prior Publication Data

US 2007/0074772 A1 Apr. 5, 2007

(30) Foreign Application Priority Data

Jul. 17, 2004 (CN) .................... 2004 2 0062895 U
Aug. 21, 2004 (CN) .................... 2004 2 0078956 U

(51) Int. Cl.
*F16K 11/08* (2006.01)
(52) U.S. Cl. .................... 137/625.46; 210/191; 210/278
(58) Field of Classification Search ............ 137/625.46, 137/625.47; 210/141, 142, 190, 191, 277, 210/278
See application file for complete search history.

(56) References Cited

U.S. PATENT DOCUMENTS

| | | | | |
|---|---|---|---|---|
| 2,309,032 A | * | 1/1943 | Zimmerman | ................. 210/278 |
| 2,777,515 A | * | 1/1957 | Stirling | ....................... 210/278 |
| 4,632,150 A | * | 12/1986 | Gagas | ................... 137/625.46 |
| 5,162,080 A | | 11/1992 | Drager et al. | |
| 5,244,013 A | * | 9/1993 | Gagas | ................... 137/625.46 |
| 2002/0124895 A1 | | 9/2002 | Thiele et al. | |
| 2002/0148516 A1 | | 10/2002 | Bartkus et al. | |

FOREIGN PATENT DOCUMENTS

CN 2092002 U 1/1992
CN 2483571 Y 3/2002

* cited by examiner

*Primary Examiner*—John Fox
(74) *Attorney, Agent, or Firm*—Matthias Scholl P.C.; Matthias Scholl

(57) ABSTRACT

A multi-functional flow control valve for a water treatment system includes a valve body having a water inlet port, a water outlet port and an effluent outlet. A valve core connected with a valve rod is placed inside the valve body. The valve body defines a flow channel therein for connecting with an inside and an outside of a filter element of the water treatment system, respectively. The valve core includes a moving valve disk and a fixed valve disk whose head faces are aligned hermetically rotationally. The moving valve disk is connected to the valve rod. The fixed valve disk defines a plurality of through holes which are connected to the water inlet port, the water outlet port and the effluent outlet, respectively. The moving valve disk defines a through hole and two blind recesses therein. By rotating the moving valve disk, the through hole and the blind recesses in the moving valve disk are aligned to corresponding holes in the fixed valve disk for forming different liquid flow channels thereby to realize control of a flow. The through hole and the blind recesses in the moving valve disk and the plurality of through holes in the fixed valve disk are allocated on the same turning circle. This invention realizes different controlled cycles of softening, purification, backwash and regeneration by changing the different aligning positions of the holes and the blind recesses in the moving and the fixed valve disks. Thus designed, the valve features easy operation and a compact structure, applicability for various industrial water treatment systems as well as household water treatment systems and improved quality of water treatment.

2 Claims, 16 Drawing Sheets

MULTI-FUNCTIONAL FLOW CONTROL VALVE FOR WATER TREATMENT SYSTEMS

BACKGROUND OF THE INVENTION

1. Field of the Invention

This invention relates to a multi-functional flow control valve for water treatment systems.

2. Description of the Prior Art

All existing industrial and household water treatment systems depend on switching function of multi-functional flow control valves for the purposes of softening, purification, backwash and regeneration of effluent. Typical of the valves on current market are Fleck valves and Autotrol valves. The Fleck valve, produced by Pentair, Inc., USA, has several layers of seal rings in a valve body thereof, which are separated by several working of plastics, thereby allowing space therebetween. The seal rings are sealed against the valve body on an external side thereof and against a cylinder encapsulated piston on an internal side thereof. The encapsulated piston is drawn up and down and positioned at different positions to form different flow channels. That is, the performance of the multi-port valve is realized by the encapsulated piston being placed at different positions along the axis. The Autotrol valve, produced by Autotrol Corporation, also in USA, has several valves arranged along a band in a valve body thereof. A cam rotor axis with several cams at different angles is worked by an engine. As the cam rotor axis rotates, the cams at different angles are open to certain ports but closed to others, thereby to realize different flow channels and the desired functions.

Apparently, some types of multi-functional flow control valves exist. One combines several valves into one valve body, which results in a more complicated structure, difficulty in manufacturing, bigger size and inconvenience in installation. Another type of flow control valves connects several external valves and the flow is controlled by opening and closing different valves in different positions. This type is difficult to install and inconvenient to operate. The third type features the movements of the encapsulated piston in the sealed cavity. The flow is controlled and directed by locating the encapsulated piston in different positions. However, the problem with this structure is that the flows in those channels are easily mixed and thus undermine the treatment effect.

SUMMARY OF THE INVENTION

An object of the present invention is to provide a multi-functional flow control valve of water treatment systems which features a simplified and compact structure and easy operation for softening, purification, backwash and regeneration of effluent.

To achieve the above-mentioned object, a multi-functional flow control valve of water treatment systems developed employing the theory of hermetical head faces in accordance with a preferred embodiment of the present invention is provided. The valve includes a valve body having a water inlet port, a water outlet port and an effluent outlet. A valve core connected with a valve rod is placed inside the valve body. The valve body defines a flow channel therein for connecting with an inside and an outside of a filter element of the water treatment system, respectively. The valve core includes a moving valve disk and a fixed valve disk of which head faces are aligned hermetically rotationally. The moving valve disk is connected to the valve rod. The fixed valve disk defines a plurality of through holes therein which are connected to the water inlet port, the water outlet port and the effluent outlet, respectively. The moving valve disk defines a through hole and two blind recesses therein. By rotating the moving valve disk, the through hole and the blind recesses in the moving valve disk are aligned with corresponding holes in the fixed valve disk for forming different liquid flow channel thereby realizing control of a flow. The through hole and the blind recesses in the moving valve disk and the plurality of through holes in the fixed valve disk are allocated on a same turning circle.

The principles for design of the invention is basically that different ports are allocated on a plane circle, and when the moving valve disk is rotated, some ports are opened and some are closed.

When under use, the moving valve disk is rotated manually or by an engine, and different controlled cycles of softening, backwash, regeneration, fast rinse, etc, are realized by aligning different through holes and blind recesses on the moving and the fixed valve disks. On a whole the present invention features easy operation, a compact structure, easy manufacturing, quick installation, a wide range of applications in various industrial and household water treatment systems and improved quality of water treatment.

The following are detailed description of this invention illustrated with drawings and embodiments.

BRIEF DESCRIPTION OF THE DRAWINGS

FIG. 1 is a top view of a valve body of the first embodiment.

FIG. 2 is a top view of a fixed valve disk of the first embodiment.

FIG. 3 is a top view of a moving valve disk of the first embodiment.

FIG. 4 is a structure diagram of the first embodiment in a softening and purification cycle.

FIG. 5 is a state diagram of the fixed and the moving valve disks in an aligned phase as shown in FIG. 4.

FIG. 6 is a structure diagram of the first embodiment in a backwash cycle.

FIG. 7 is a state diagram of the fixed and the moving valve disks in the aligned phase as shown in FIG. 6.

FIG. 8 is a structure diagram of the first embodiment in a regeneration cycle.

FIG. 9 is a state diagram of the fixed and the moving valve disks in the aligned phase as shown in FIG. 8.

FIG. 10 is a structure diagram of the first embodiment when a brine tank is being refilled, in accordance with the present invention.

FIG. 11 is a state diagram of the fixed and the moving valve disks in the aligned phase as shown in FIG. 10.

FIG. 12 is a structure diagram of the first embodiment in a fast rinse cycle, in accordance with the present invention.

FIG. 13 is a state diagram of the fixed and the moving valve disks in the aligned phase as shown in FIG. 12.

FIG. 14 is another structure diagram of the first embodiment in an purification cycle.

FIG. 15 is a structure diagram of the second embodiment in the softening and purification cycle.

FIG. 16 is a state diagram showing relative positions of a fixed and a moving valve disks as shown in FIG. 15.

FIG. 17 is a structure diagram of the second embodiment in the backwash cycle.

FIG. 18 is a state diagram showing relative positions of the fixed and the moving valve disks as shown in FIG. 17.

FIG. 19 is a structure diagram of the second embodiment in the generation cycle.

FIG. 20 is a state diagram showing relative positions of the fixed and the moving valve disks as shown in FIG. 19.

FIG. 21 is a structure diagram of the second embodiment in the fast rinse cycle.

FIG. 22 is a state diagram showing relative positions of the fixed and the moving valve disks as shown in FIG. 21.

FIG. 23 is a structure diagram of the second embodiment in the softening (and brine refill) cycle.

FIG. 24 is a state diagram showing relative positions of the fixed and the moving valve disks as shown in FIG. 23.

FIG. 25 is a structure diagram of the moving valve disk of the second embodiment.

FIG. 26 is a structure diagram of the fixed valve disk of the second embodiment.

FIG. 27 is a structure diagram of a moving valve disk of the third embodiment.

FIG. 28 is a structure diagram of a fixed valve disk of the third embodiment.

FIG. 29 is a structure diagram of the third embodiment in the regeneration cycle.

FIG. 30 is a state diagram showing relative positions of the fixed and the moving valve disks as shown in FIG. 29.

DETAILED DESCRIPTION OF THE INVENTION

A First Embodiment

Figure 1:
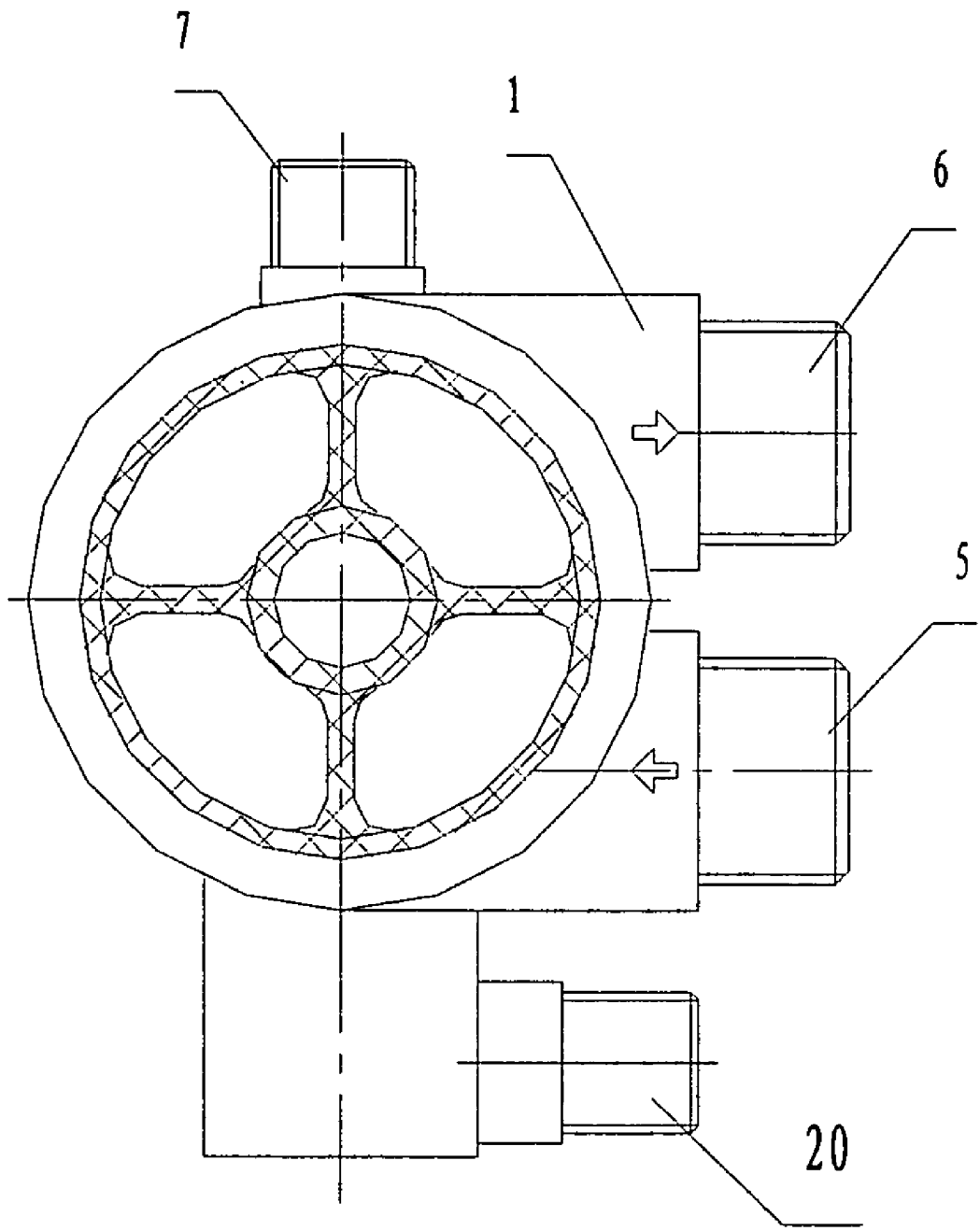
FIGS. 1-14 are illustrations for a first embodiment of the present invention.
Figure 2:
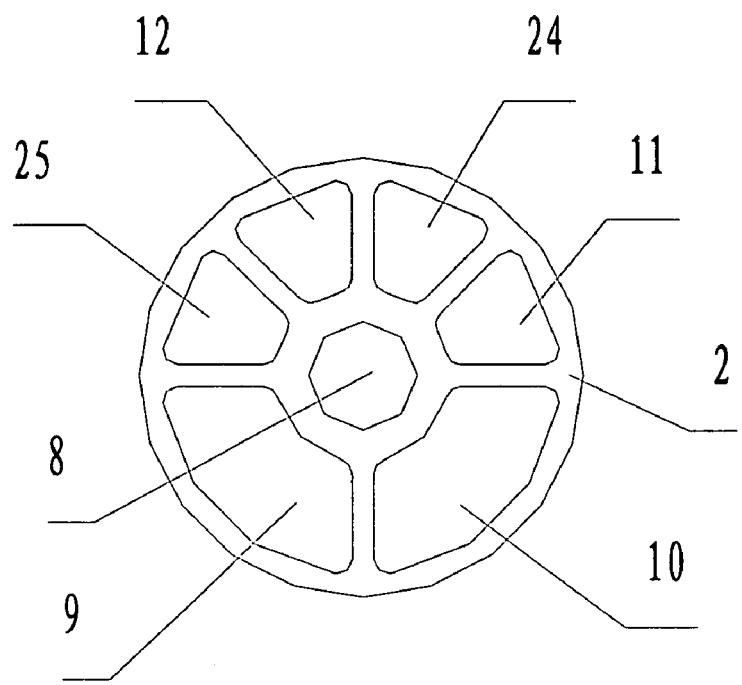
Figure 3:
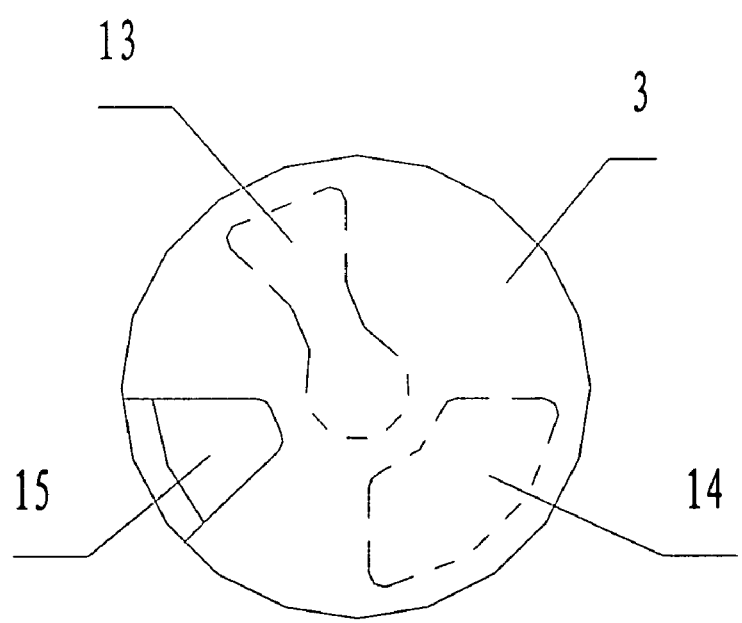

Referring to FIGS. 1-3, there are a water inlet port 5, a water outlet port 6 and an effluent outlet 7 in a valve body 1, which is connected separately to an inside and an outside of a filter element 18 of a water treatment system through a flow channel. A leg flow channel 16 is formed in the flow channel from the water inlet port 5 to the filter element 18 and the leg flow channel 16 fixes an ejector nozzle 17 inside. A brine inlet port 20 is defined near the ejector nozzle 17 in the valve body 1, which may connect with a brine tank 21 of the water treatment system. A valve core of the valve body 1 includes a moving valve disk 3 and a fixed valve disk 2, of which head faces are aligned hermetically rotationally. The moving valve disk 3 is connected to a valve rod 4. The fixed valve disk 2 defines a through hole 8 in a center of the head face thereof to connect with the effluent outlet 7 of the valve body 1 and six through holes along a circle around the center of the head face thereof, among which a through hole 9 is connected to the outside of the filter element 18, through holes 10, 12 are connected to the inside of the filter element 18, a through hole 11 is connected to the water outlet port 6, and through holes 24 and 25 are connected to an inlet port and an outlet port of the ejector nozzle 17, respectively. The moving valve disk 3 forms a radial blind recess 13 from a center to an edge in the hermetical aligning head face thereof and a blind recess 14 shaped as a circular arc around the center in the hermetical aligning head face thereof. The moving valve disk 3 further forms a through hole 15 which permanently opens to the water inlet port 5. The holes and the blind recesses in the fixed valve disk 2 and the moving valve disk 3 are allocated along a same turning circle for the purpose of aligning. The fixed valve disk 2 and the moving valve disk 3 can be made of ceramics or other material. If the material is not hard enough, a separating bar can be placed within some bigger holes like the through holes 9 and 10 to strengthen the holes. The through holes 10 and 12 can be made into one hole, but it is more difficult to produce.

When in operation, the valve body 1 is fixed on a water treatment tank 19, and the filter element 18 is fixed in the water treatment tank 19, or filtering material can be placed directly in water treatment tank 19 instead of the filter element 18. Normally a flow between the valve body 1 and the filter element 18 passes through a distributor 22 in the water treatment tank 19. The filter element 18 made from activated carbon or sand leach can be used for purification and the filter element 18 made from resin is used for softening. The system can be operated manually or by electricity. In most industrial water treatment systems, the valve rod 4 is worked by engines and a switching between different cycles is realized by a variation in the aligning positions of the different holes in the moving valve disk 3 and the fixed valve disk 2.

The following working process of the water treatment system using a resin filter element 18 is provided to illustrate the full range of working cycles of this embodiment. Brine or other regenerating material should be added for the regeneration of resin material. The water treatment system can be equipped with the brine tank 21 connecting with the brine inlet port 20 of the valve body 1 by a water inlet valve 23.

Figure 4:
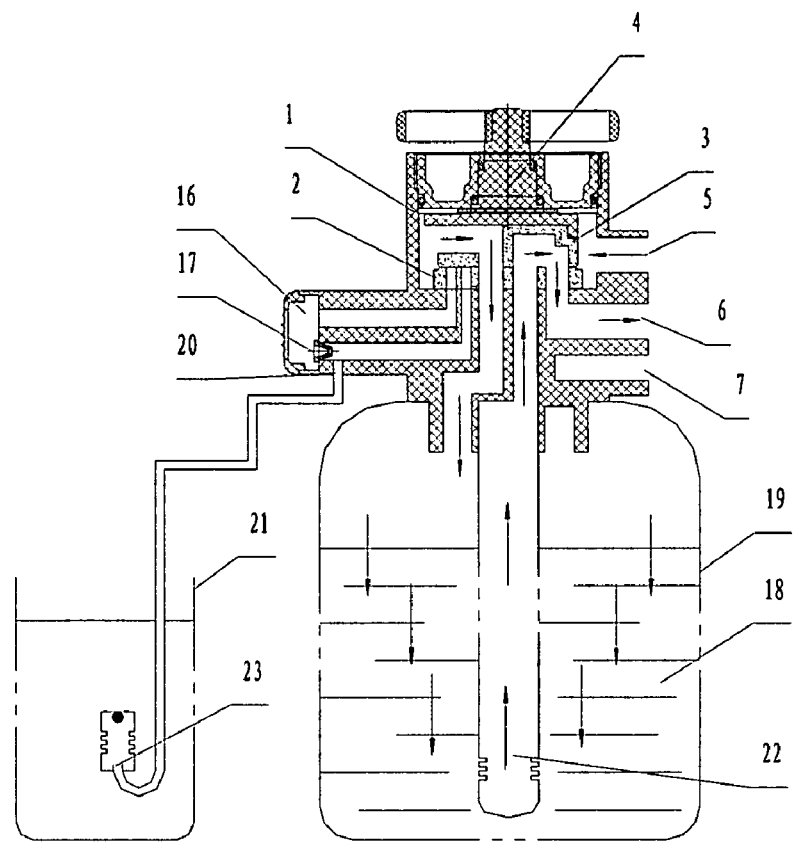
Figure 5:
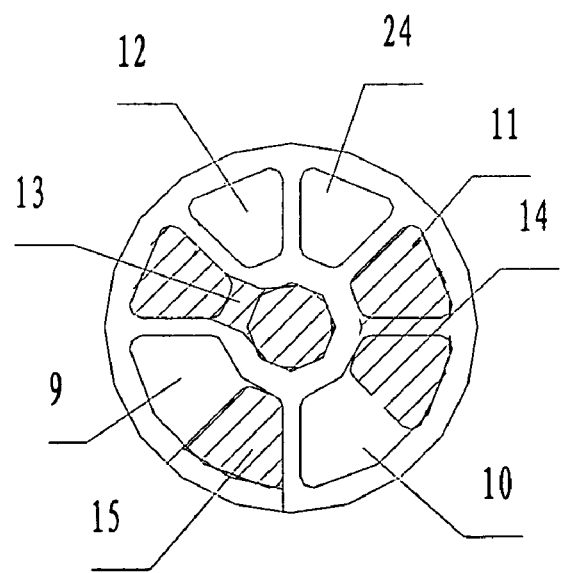

In a softening cycle, as shown in FIGS. 4 and 5, the through hole 15 in the moving valve disk 3 is aligned with the through hole 9 in the fixed valve disk 2 and the blind recess 14 covers the through holes 10 and 11, which are thus connected. An inward water flow from the water inlet port 5 passes by the through hole 15 into the through hole 9, then into the water treatment tank 19. After filtered by the filter element 18, the water flow runs through the distributor 22, the through hole 10, the blind recess 14 and the through hole 11 before it flows out through the water outlet port 6. In this cycle when the water flow runs through the water inlet port 5 to the flow channel outside the filter element 18, the blind recess 13 covers the through holes 8 and 25, so no flow channel is formed and there is no flow in the leg flow channel 16.

Figure 6:
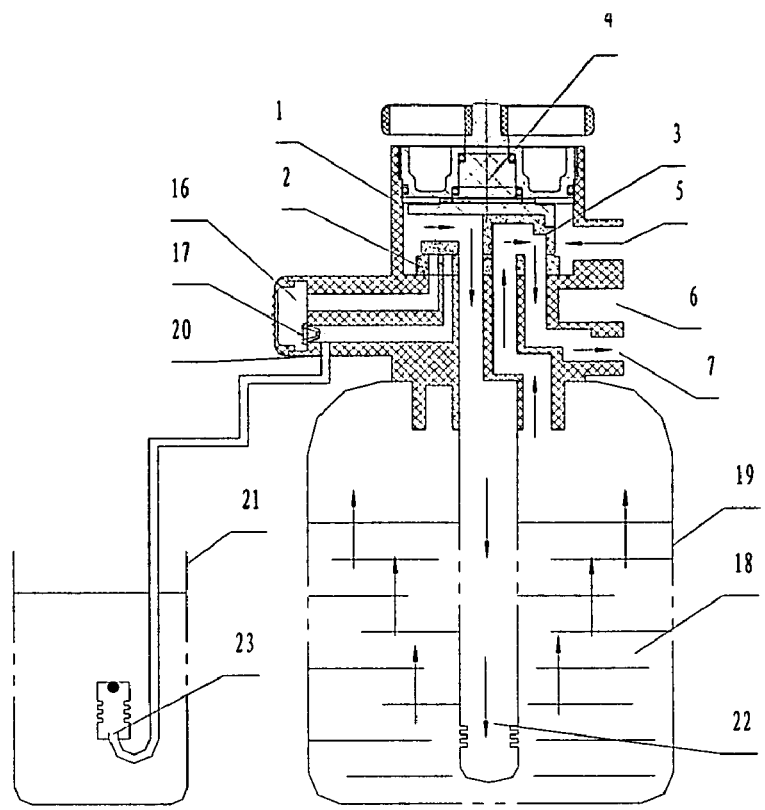
Figure 7:
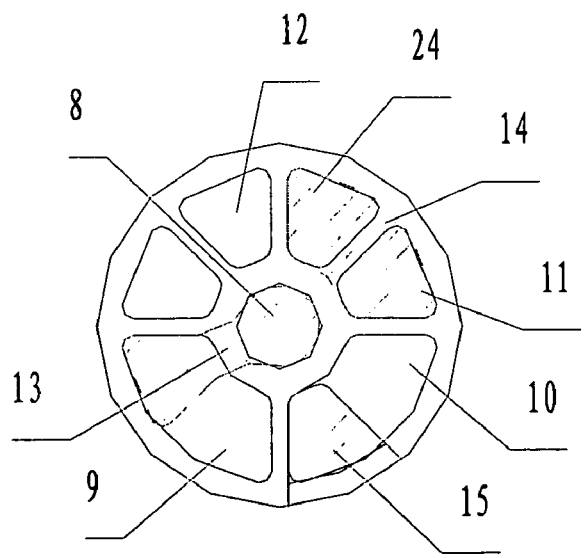

In a backwash cycle, as shown in FIGS. 6 and 7, the through hole 15 in the moving valve disk 3 is aligned with the through hole 10 in the fixed valve disk 2 and the blind recess 13 covers the through holes 8 and 9 in the fixed valve disk 2. The water flow runs by the through holes 15 and 10, enters the distributor 22, reaches the inside of the filter element 18, then backwashes the residue accumulated in the filter element 18 and becomes waste water which passes through the blind recess 13 into the through hole 8 and outpours from the effluent outlet 7.

Figure 8:
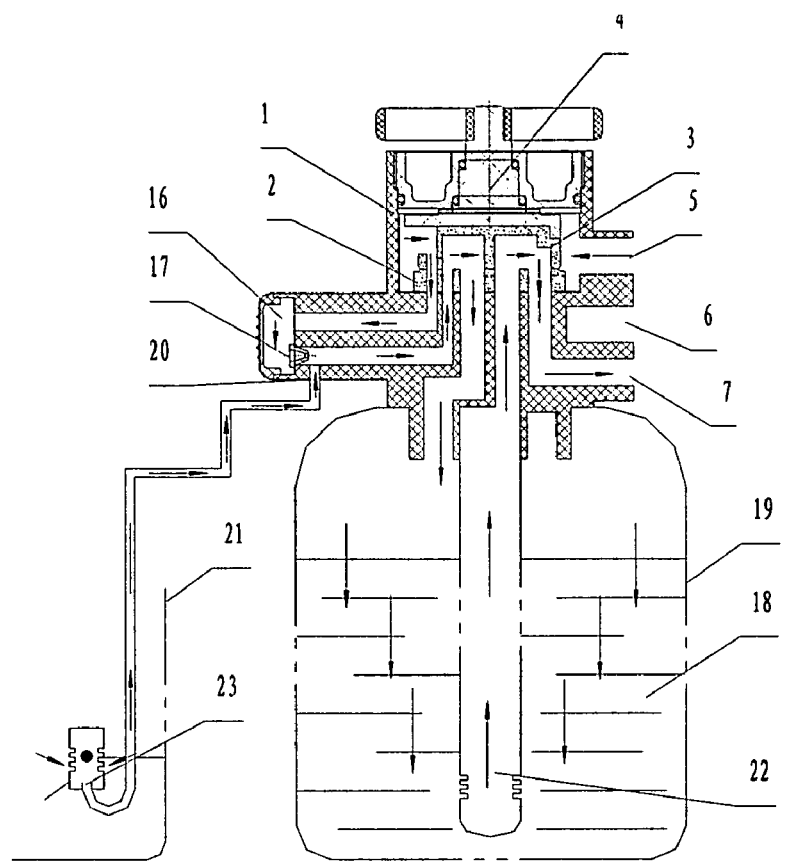
Figure 9:
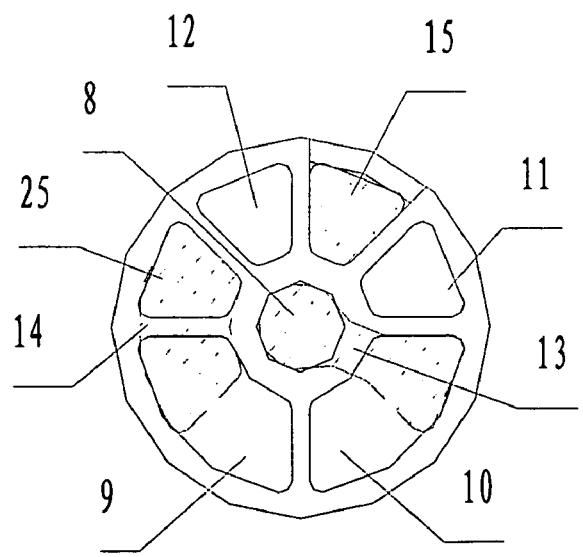

In a regeneration cycle through in-taking salt, as shown in FIGS. 8 and 9, the through hole 15 in the moving valve disk 3 is aligned with the through hole 24 in the fixed valve disk 2 and the blind recess 14 covers the through holes 25 and 9, which are thus connected. The water flow from the water inlet port 5 passes by the through hole 15, enters the through hole 24, and jets out through the ejector nozzle 17 at the end of the leg flow channel 16. In this cycle, the water flow causes negative pressure at the outlet port of the ejector nozzle 17, i.e., the brine inlet port 20 of the valve body 1, after jetting. The brine in the brine tank 21 is in-taken by the brine inlet port 20 through the water inlet valve 23. The mixed flow of the brine and the water runs from the through hole 25 to the through hole 9 through the blind recess 14, then into the water treatment tank 19. The flow is regenerated through the filter element 18, passes the distributor 22 into the through hole 10, enters the through hole 8 via the blind recess 13 and outpours from the effluent outlet 7. When a water level of the brine tank 21 falls to a pre-defined point, the water inlet valve 23 shuts automatically.

Figure 10:
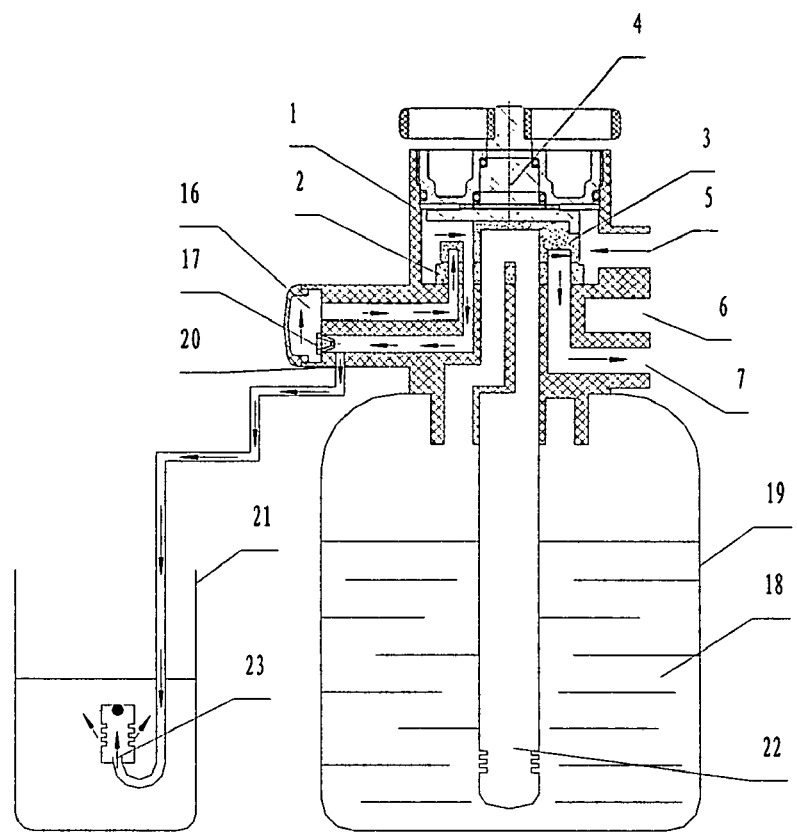
Figure 11:
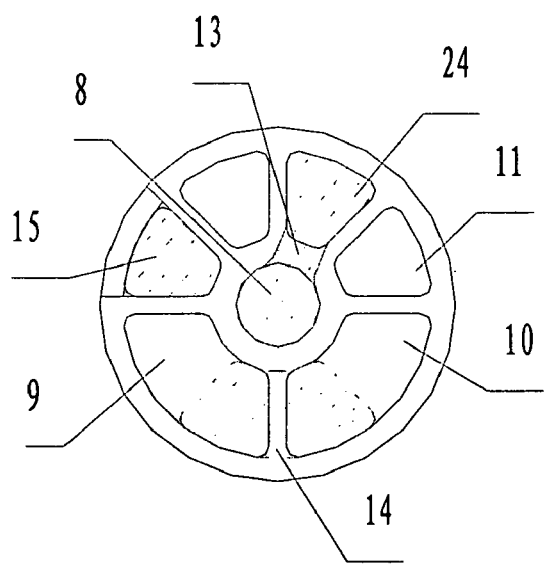

After the brine in-taking cycle is completed, since the brine in the brine tank 21 has been used, water has to be added. As shown in FIGS. 10 and 11, the through hole 15 in the moving valve disk 3 is aligned with the through hole 25 in the fixed valve disk 2 and the blind recess 13 covers the through holes 8 and 24, which are thus connected. The water flow reaches the outlet port of the ejector nozzle 17 from the through hole 15 through the through hole 25 and the leg flow channel 16. As the outlet port of the ejector nozzle 17 is thinner, most of the flow runs into the brine tank 21 through the brine inlet port 20. When enough water accumulates, salt can be added into the brine tank 21 to provide the brine for regeneration. The whole process is easily done. A small portion of water flows back through the ejector nozzle 17 and the through hole 24, enters the through hole 8 via the blind recess 13, and outpours from the effluent outlet 7.

Figure 12:
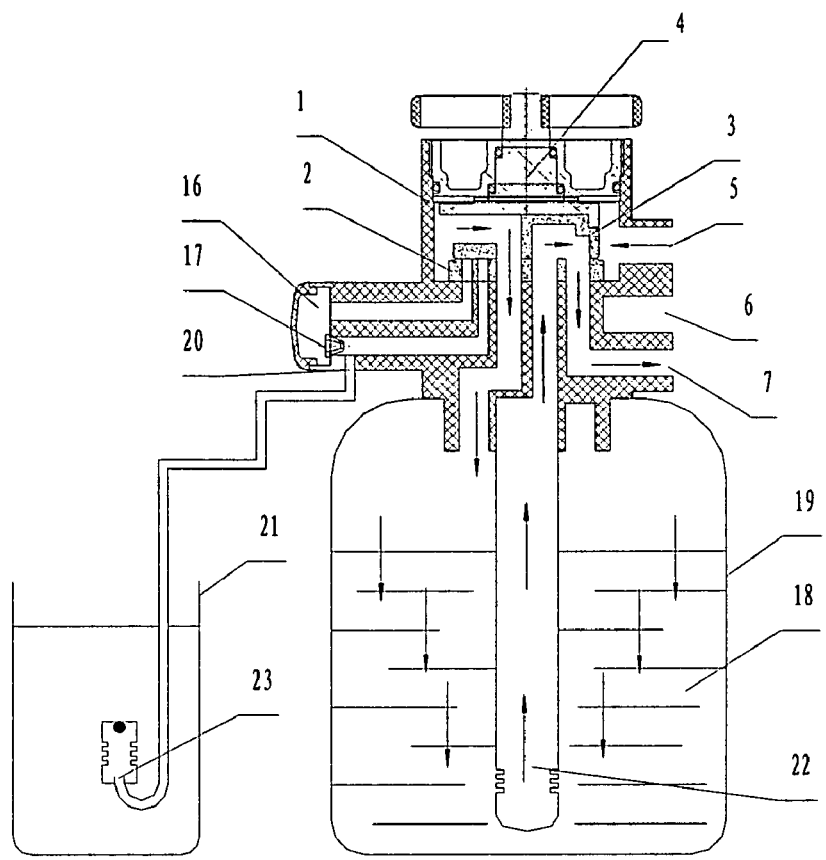
Figure 13:
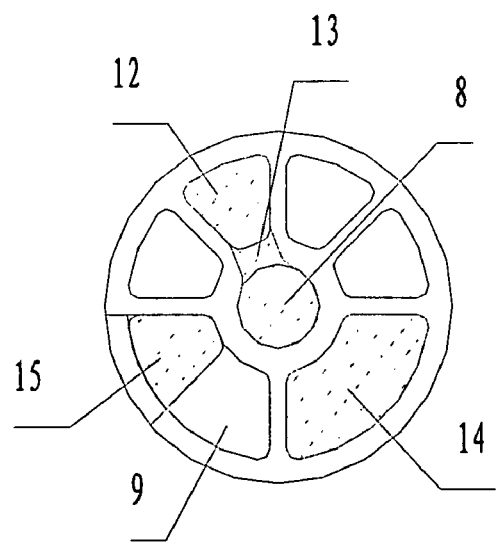

In a fast rinse cycle, as shown in FIGS. 12 and 13, the through hole 15 in the moving valve disk 3 is aligned with the through hole 9 in the fixed valve disk 2 and the blind recess 13 covers the through holes 8 and 12 in the fixed valve disk 2. The water flow runs by the through holes 15 and 9, enters the filter element 18, and washes the residue brine out of the filter element 18. The residue brine runs through the distributor 22, the through hole 12, the blind recess 13 and the through hole 8 and outpours from the effluent outlet 7.

Figure 14:
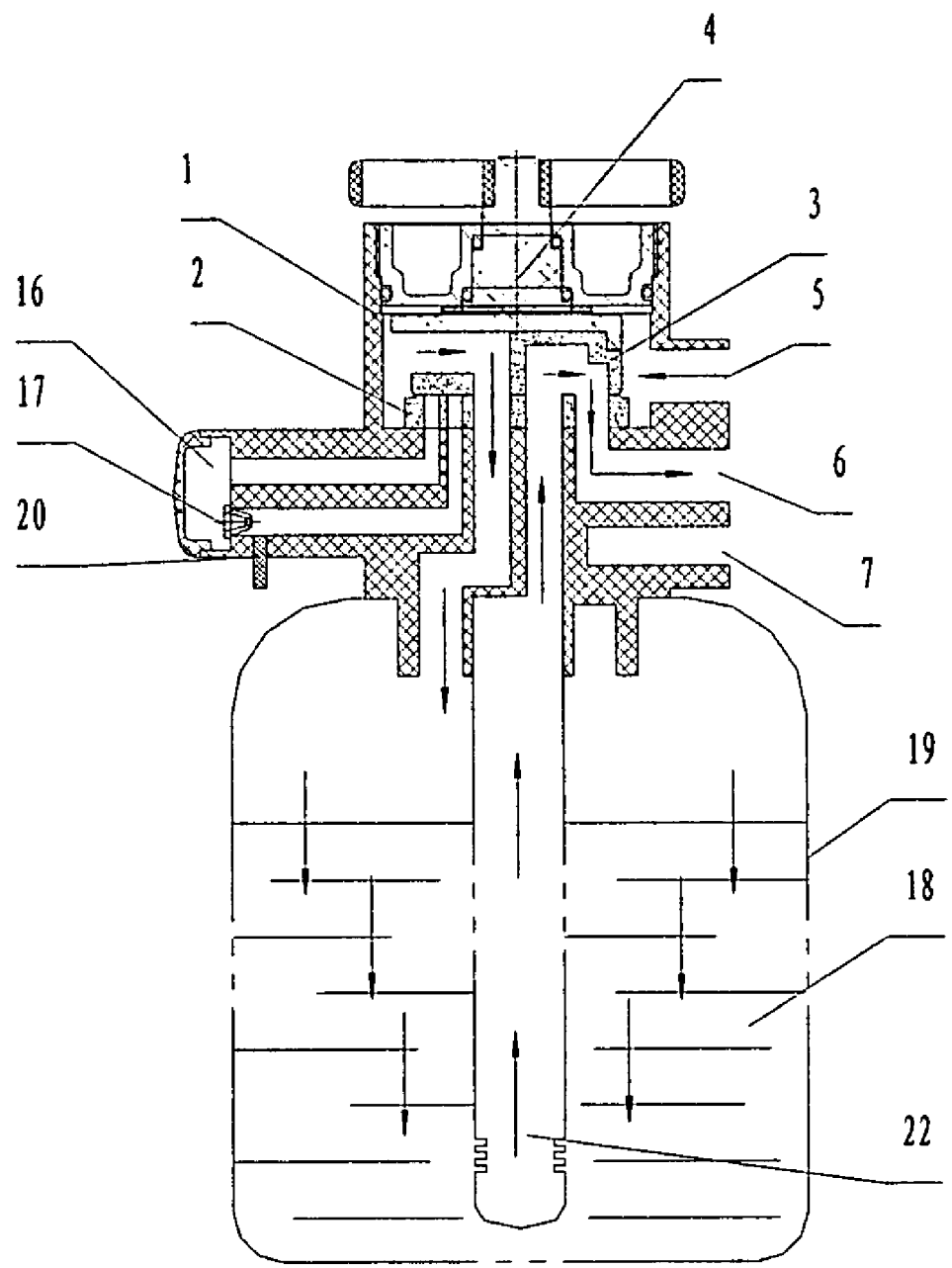

Only in a purification cycle, the filter element 18 made from activated carbon material or sand leach can be added into the water treatment tank 19, and no regeneration is needed. As shown in FIG. 14, the brine inlet port 20 can be blocked. Similar working procedures are followed for purification, backwash and fast rinse. In the course of production, the leg flow channel 16, the ejector nozzle 17 and the brine inlet port 20 can be omitted in the valve body 1 and the through hole 24 and the through hole 25 can also be omitted, which makes a simpler structure.

A Second Embodiment

Figure 25:
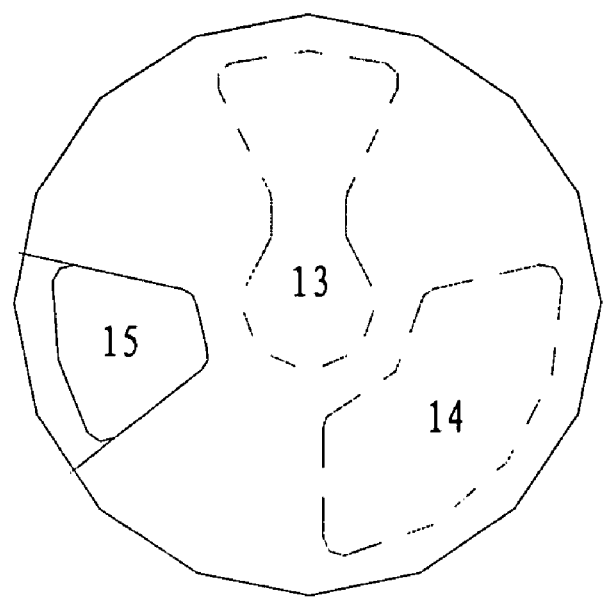
Figure 26:
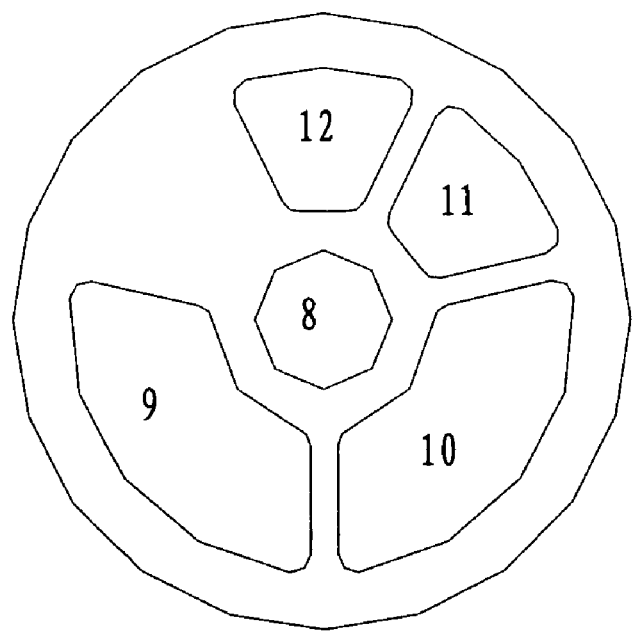

FIGS. 25 and 26 show another moving valve disk and another fixed valve disk of the second embodiment, respectively.

Figure 15:
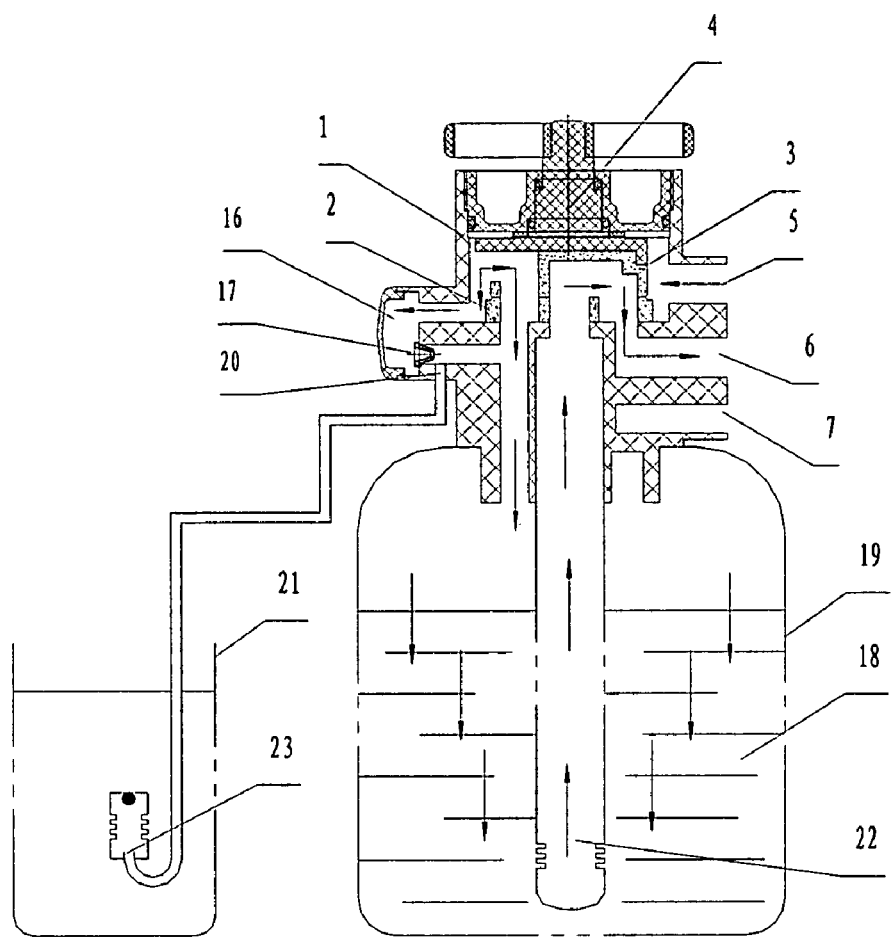
FIGS. 15-26 are illustrations for a second embodiment of the present invention.
Figure 16:
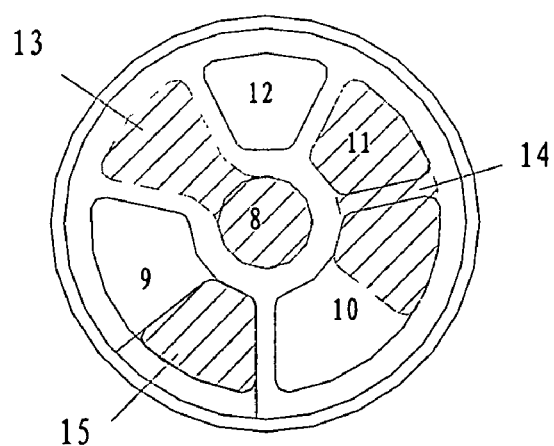

In the course of softening, as shown in FIGS. 15 and 16, the through hole 15 in the moving valve disk 3 is aligned with the through hole 9 in the fixed valve disk 2 and the lower blind recess 14 in the moving valve disk 3 covers the through holes 10 and 11, which are thus connected. The upper blind recess 13 in the moving valve disk 3 is only connected to the through hole 8 in the fixed valve disk 2 and no through channel is formed. In this cycle, the water flow runs into the through hole 9 in the fixed valve disk 2 by the through hole 15 in the moving valve disk 3. As the through hole 9 leads to a top of the water treatment tank 19, the water flow runs into the top of the water treatment tank 19 and down through a resin layer where the water is changed into softened water. The softened water then returns to a central channel of the water treatment tank 19 through a lower distributor, and runs upward to the through hole 10 in the fixed valve disk 2. As the through hole 10 and the through hole 11 are connected by the blind recess 14 in the moving valve disk 3, the softened water flows into the through hole 11 through the through hole 10. Since the through hole 11 leads to the water outlet port 6, the softened water flows out from the water outlet port 6.

Figure 17:
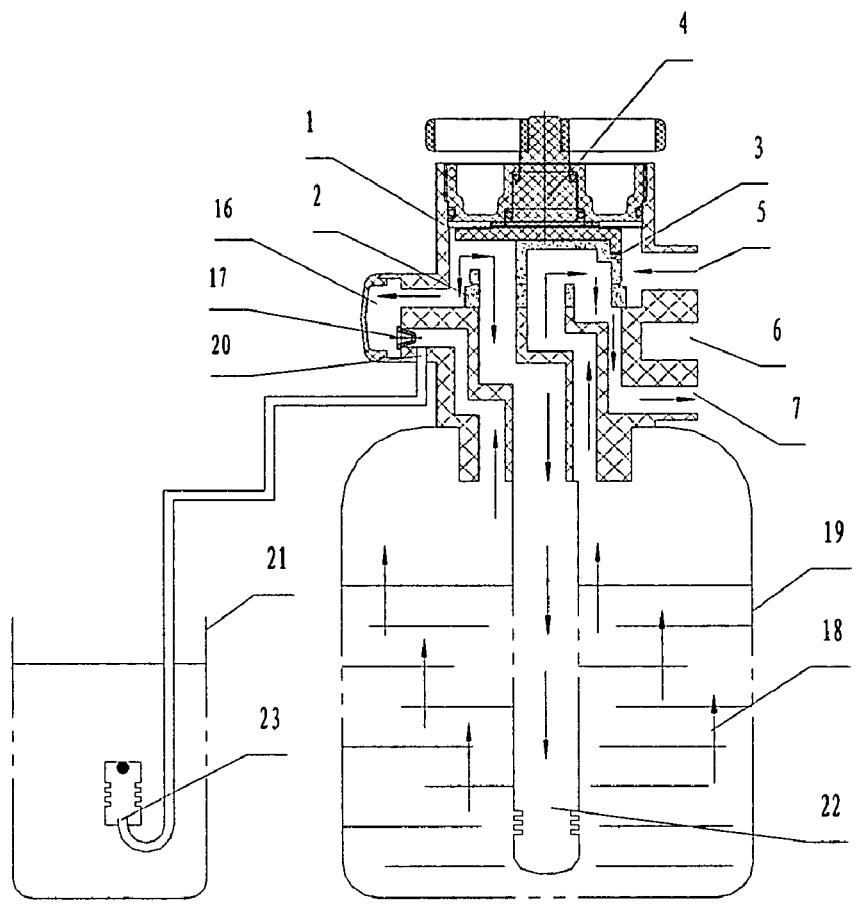
Figure 18:
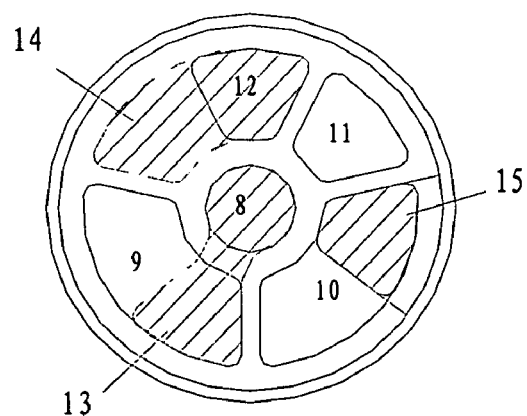

In the backwash cycle, as shown in FIGS. 17 and 18, the through hole 15 in the moving valve disk 3 is aligned with the through hole 10 in the fixed valve disk 2 and the lower blind recess 13 in the moving valve disk 3 covers the through holes 9 and 8, which are thus connected. The upper blind recess 14 in the moving valve disk 3 is only connected to the through hole 12 in the fixed valve disk 2 and no through channel is formed. In this cycle, the water flow runs into the through hole 10 in the fixed valve disk 2 by the through hole 15 in the moving valve disk 3. As the through hole 10 leads to the central channel of the water treatment tank 19, the water flow runs into the central channel and down through the lower distributor into the water treatment tank 19. The water flow then returns upward to the resin layer and reaches the through hole 9 in the fixed valve disk 2. As the through hole 9 and the through hole 8 are connected by the blind recess 13 in the moving valve disk 3, the water flow runs into the through hole 8 through the through hole 9. As the through hole 8 leads to the effluent outlet 7, after the backwash cycle, the waste water flow runs out from the effluent outlet 7.

Figure 19:
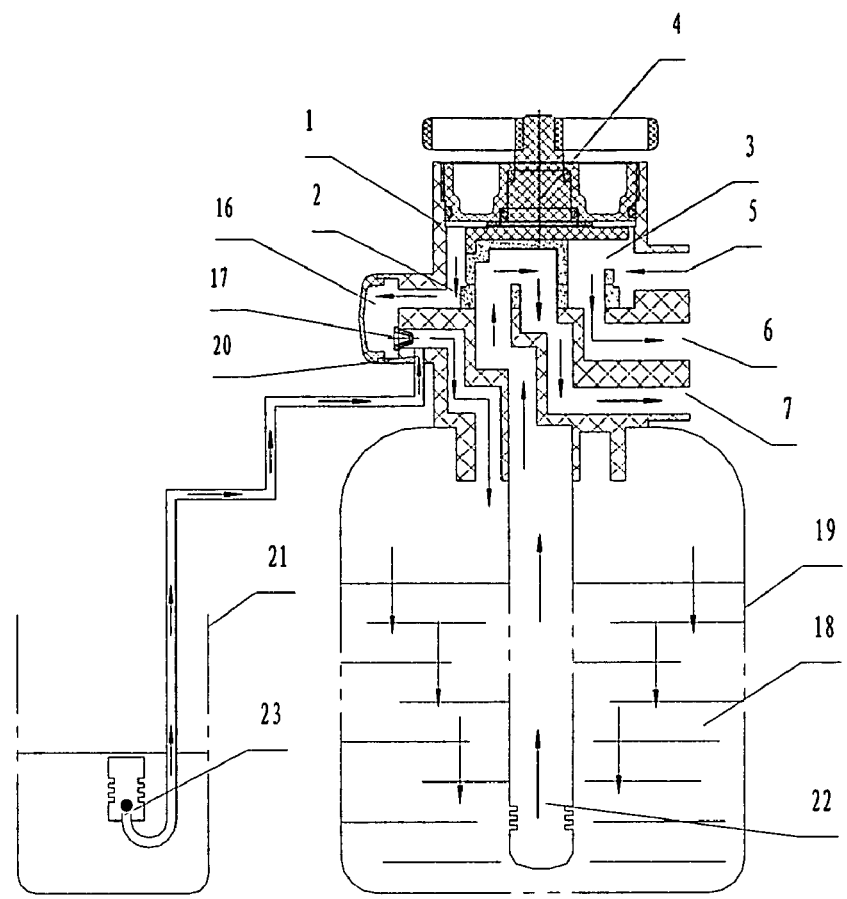
Figure 20:
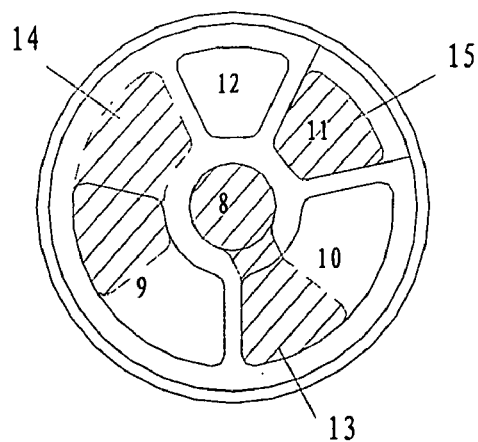

In the regeneration cycle, as shown in FIGS. 19 and 20, the through hole 15 in the moving valve disk 3 is aligned with the through hole 11 in the fixed valve disk 2 and the lower blind recess 13 in the moving valve disk 3 covers the through holes 10 and 8, which are thus connected. The upper blind recess 14 in the moving valve disk 3 is only connected to the through hole 9 in the fixed valve disk 2 and no through channel is formed. At this time, the water flow runs into the through hole 11 in the fixed valve disk 2 by the through hole 15 in the moving valve disk 3. As the through hole 11 leads to the water outlet port 6, a portion of the water flows directly runs out from the water outlet port 6. Another portion of the water flow jets out from the ejector nozzle 17. After jetting, the flow causes negative pressure at the outlet port of the ejector nozzle 17, i.e., the brine inlet port 20 of the valve body 1, thereby to open the water inlet valve 23 of the brine tank 21. The brine in the brine tank 21 is in-taken by the brine inlet port 20 through the water inlet valve 23. The mixed flow of the brine and the water runs to the top of the water treatment tank 19, flows down through the resin layer, and reaches the lower distributor. Then the flow runs upward through the central channel into the through holes 10 and 8 on the fixed valve disk 2. As the through hole 10 and the through hole 8 in the fixed valve disk 2 are connected by the blind recess 13 in the moving valve disk 3, the water flow runs by the through hole 10 to the through hole 8. As the through hole 8 leads to the effluent outlet 7, the waste water after brine in-taking flows out from the effluent outlet 7.

Figure 21:
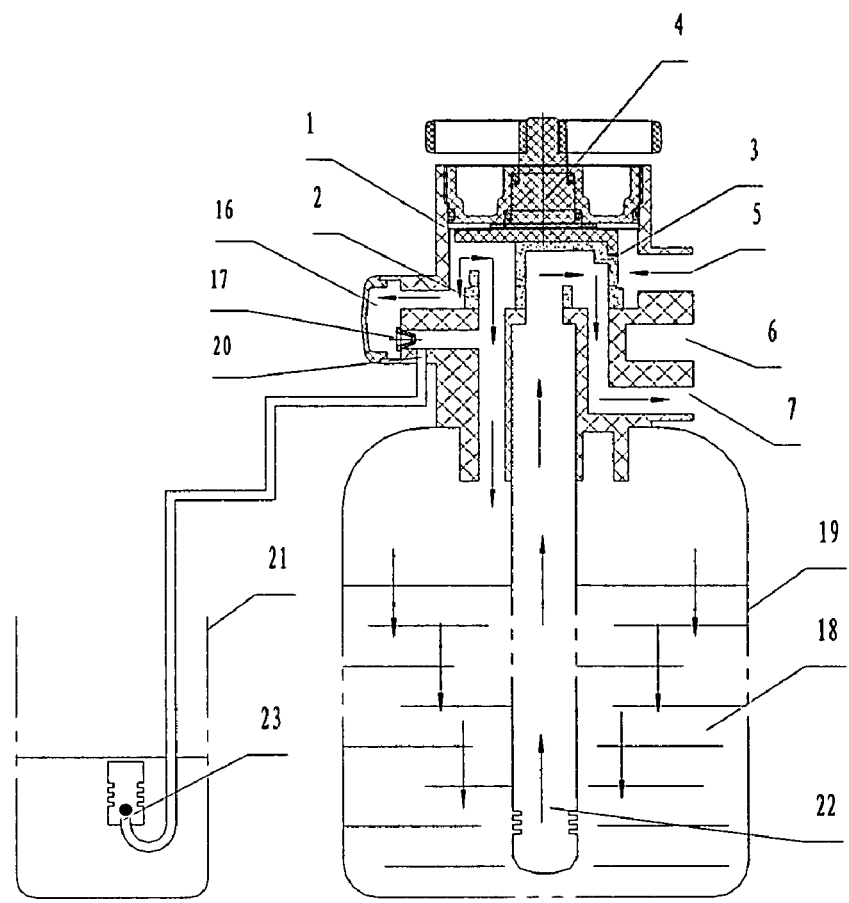
Figure 22:
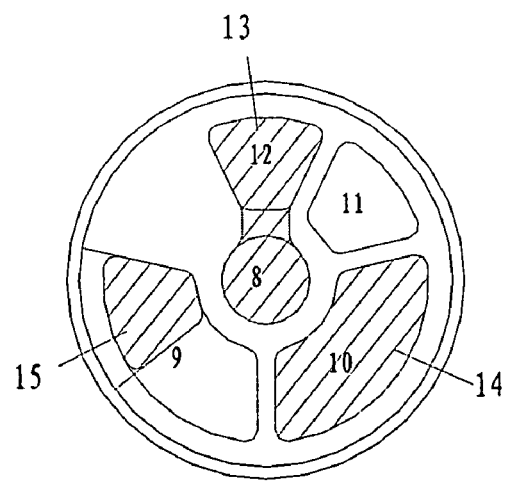

In the fast rinse cycle, as shown in FIGS. 21 and 22, the through hole 15 in the moving valve disk 3 is aligned with the through hole 9 in the fixed valve disk 2 and the lower blind recess 14 in the moving valve disk 3 is only connected with the through holes 10 and no through channel is formed. The upper blind recess 13 in the moving valve disk 3 covers the through hole 12 and the through hole 8, which are thus connected. In this phase, the water flow runs into the through hole 9 in the fixed valve disk 2 by the through hole 15 in the moving valve disk 3. As the through hole 9 leads to the top of the water treatment tank 19, the water flow runs into the top of the water treatment tank 19 and down through the resin layer where the water flow washes down the brine regenerated by the resin layer which has taken in the brine. The water flow then returns to the central channel through the lower distributor, and runs upward to the through hole 10 and the through hole 12 in the fixed valve disk 2. As the through hole 12 and the through hole 8 is connected by the blind recess 14 in the moving valve disk 3, the water flow runs into the through hole 8 by the through hole 10 and the through hole 12. As the through hole 8 leads to the effluent outlet 7, the water after the cycle of fast rinse flows out from the effluent outlet 7.

Figure 23:
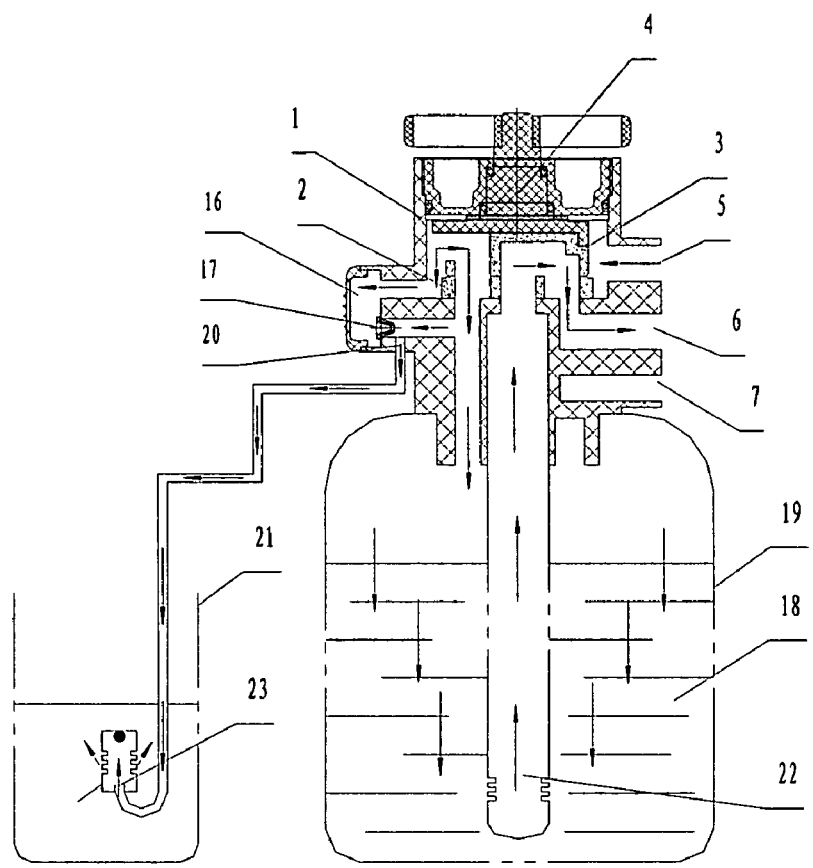
Figure 24:
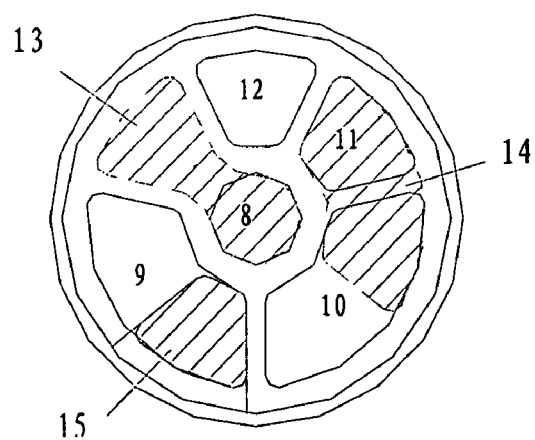

When water is added to the brine tank 21, as shown in FIG. 23 and FIG. 24, the through hole 15 in the moving valve disk 3 is aligned with the through hole 9 in the fixed valve disk 2 and the lower blind recess 14 in the moving valve disk 3 covers the through hole 10 and the through hole 11, which are thus connected. The upper blind recess 13 in the moving valve disk 3 is only connected to the through hole 9 in the fixed valve disk 2 and no through channel is formed. In this phase, the water flow runs into the through hole 9 in the fixed valve disk 2 by the through hole 15 in the moving valve disk 3. As the through hole 9 leads to the top of the water treatment tank 19, the water flow runs into the top of the water treatment tank 19 and down through the resin layer where the water is changed into softened water. The softened water then returns to the central channel of the water treatment tank 19 through lower distributor and runs upward to the through hole 10 in the fixed valve disk 2. As the through hole 10 and the through hole 11 are connected by the blind recess 14, the softened water flows into the through hole 11 via the through hole 10. As the through hole 11 leads to the water outlet port 6, the softened water flows out from the water outlet port 6. A portion of the water flow passes through a pipe of the ejector nozzle 17 and a brine in-taking valve into the brine tank 21. When the brine tank 21 is full of water, the water inlet valve 23 in the brine tank 21 shuts automatically and stops the water flow.

A Third Embodiment

FIGS. 27-30 are illustrations for the third embodiment.

Figure 27:
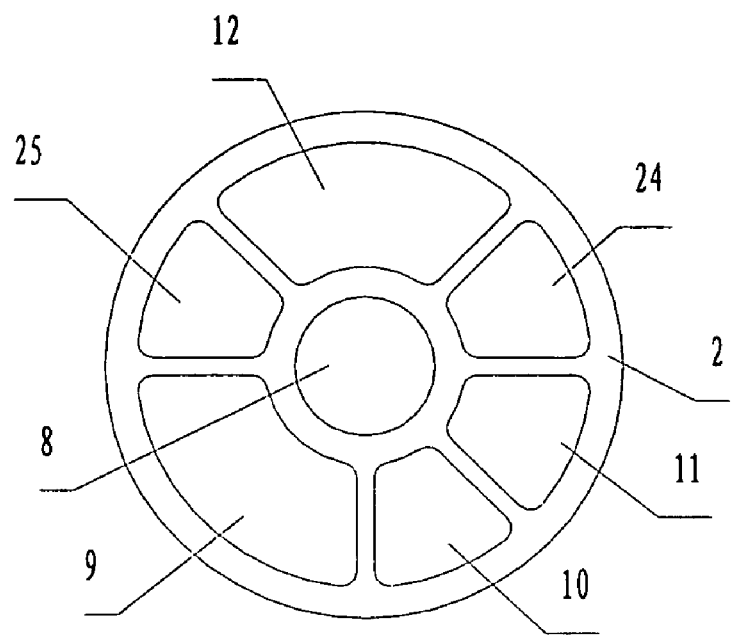
FIGS. 27-30 are illustrations for a third embodiment.
Figure 28:
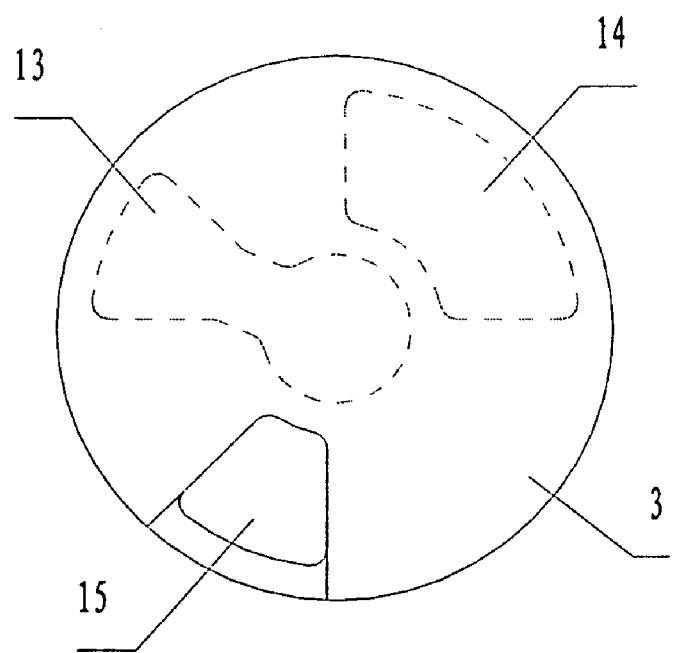

FIGS. 27 and 28 show another moving valve disk and another fixed moving valve disk of the third embodiment, respectively.

The structure diagrams and working principles of the third embodiment for the procedures of softening, backwash, brine in-taking and fast rinse are the basically same as the first embodiment.

Figure 29:
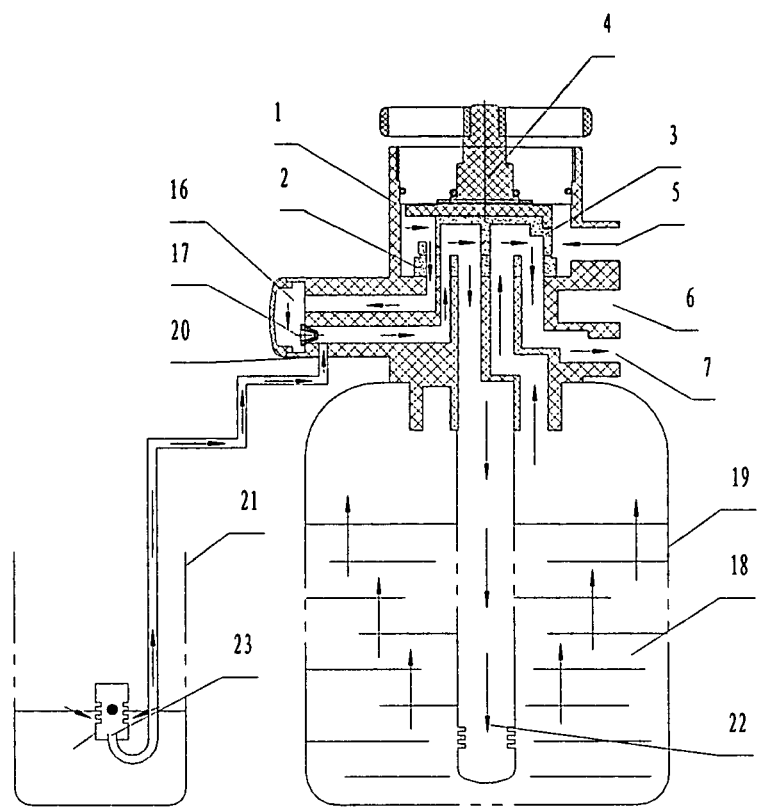
Figure 30:
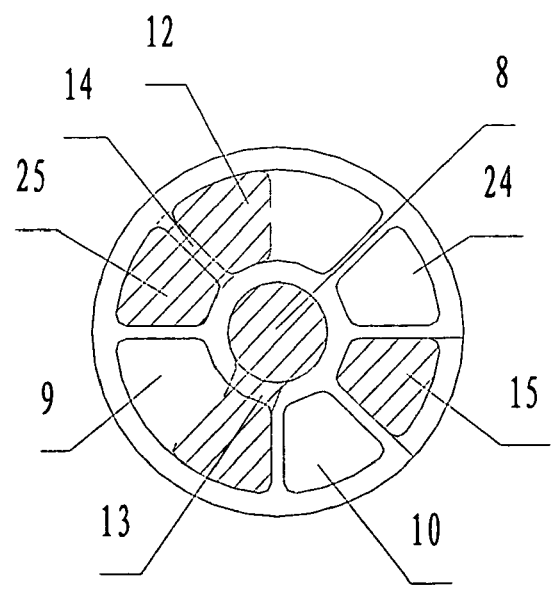

FIG. 29 and FIG. 30 show the structure and the state of the valve and relative positions of the fixed and the moving valve disks in the cycle of regeneration. The through hole 15 in the moving valve disk 3 is aligned with the through hole 11 in the fixed valve disk 2, the blind recess 13 covers and connects the through hole 9 and the through hole 8 in the fixed valve disk 2, and the blind recess 14 covers and connects the through hole 12 and the through hole 25 in the fixed valve disk 2. The water flow from the water inlet port 5 runs by the through hole 15, enters the through hole 11, and jets out from the ejector nozzle 17 at the end of the leg flow channel 16. After jetting, the water flow causes negative pressure at the outlet port of the ejector nozzle 17, i.e., the brine inlet port 20 of the valve body 1. The brine in the brine tank 21 is in-taken by the brine inlet port 20 through the water inlet valve 23. The mixed flow of the brine and the water runs from the through hole 25 to the through hole 12 via the blind recess 14 and the distributor 22, and flows into a bottom of the filter element 18 and further passes through the resin layer where the brine is regenerated. The flow then runs by the through hole 9, enters the through hole 8 via the blind recess 13 and outpours from the effluent outlet port 7. When the water level of the brine tank 21 falls to the pre-defined point, the water inlet valve 23 shuts automatically.

The third embodiment is designed to realize another structure mode of regeneration besides the first embodiment. The direction of the regenerated flow is opposite to the direction of water producing. The advantages of this mode include low brine and regenerated water consumption and high displacement ratio of resin regeneration.

INDUSTRIAL PRACTICABILITY OF THE INVENTION

This present invention realizes different controlled cycles of softening, purification, backwash and regeneration of effluent by changing the different aligning positions of the through holes in the moving and the fixed valve disks. Thus designed, the present invention features easy operation and a compact structure, applicability for various industrial water treatment systems as well as household water treatment systems and improved quality of water treatment.

What is claimed is:

1. A multi-functional flow control valve for a water treatment system, comprising:

a valve body having a water inlet port, a water outlet port and a effluent outlet and defining a flow channel therein for connecting with an inside and an outside of a filter element of the water treatment system, respectively;

a valve core placed inside the valve body and including a moving valve disk and a fixed valve disk of which head faces are aligned hermetically rotationally, the moving valve disk defining a through hole and two blind recesses therein and the fixed valve disk defining a plurality of through holes therein which are connected to the water inlet port, the water outlet port and the effluent outlet, respectively; and a valve rod connecting with the moving valve disk;

wherein the valve body defines a leg flow channel in the flow channel thereof from the water inlet port to the filter element;

an ejector nozzle is fixed in the leg flow channel;

a brine inlet port is defined at an outlet port of the ejector nozzle for connecting with a brine tank of the water treatment system; and the valve core includes the moving valve disk and the fixed valve disk of which the head faces are aligned hermetically rotationally; wherein the moving valve disk is connected to the valve rod;

the fixed valve disk defines a through hole in a center of the head face thereof to connect with the effluent outlet of the valve body and six through holes around the center of the head face thereof, among which a through hole leads to the outside of the filter element, two through holes lead to the inside of the filter element, another through hole leads to the water outlet port, and the other two through holes lead to an inlet port and the outlet port of the ejector nozzle, respectively;

the moving valve disk defines radially one blind recess in the head face thereof from a center to an edge and defines the other blind recess shaped as circular arc around the center in the head face thereof, and the through hole in the moving valve disk permanently opens to the water inlet port; and by rotating the moving valve disk, the through hole and the blind recesses in the moving valve disk are aligned with corresponding holes in the fixed valve disk for forming different liquid flow channels for realizing control of a flow and the through hole and the blind recesses in the moving valve disk and the plurality of through holes in the fixed valve disk are allocated on a same turning circle.

2. A multi-functional flow control valve for a water treatment system, comprising:

a valve body having a water inlet port, a water outlet port and a effluent outlet and defining a flow channel therein for connecting with an inside and an outside of a filter element of the water treatment system, respectively;

a valve core placed inside the valve body and including a moving valve disk and a fixed valve disk of which head faces are aligned hermetically rotationally, the moving valve disk defining a through hole and two blind recesses therein and the fixed valve disk defining a plurality of through holes therein which are connected to the water inlet port, the water outlet port and the effluent outlet, respectively; and a valve rod connecting with the moving valve disk;

wherein the valve body defines a leg flow channel in the flow channel thereof from the water inlet port to the filter element, and the leg flow channel is permanently connected with the water inlet port;

an ejector nozzle is fixed in the leg flow channel;

a brine inlet port is defined at an outlet port of the ejector nozzle for connecting with a brine tank of the water treatment system; and the valve core includes the moving valve disk and the fixed valve disk of which the head faces are aligned hermetically rotationally; wherein the moving valve disk is connected to the valve rod;

the fixed valve disk defines a through hole in a center of the head face thereof to connect with the effluent outlet of the valve body, and four through holes around the center of the head face thereof, among which a through hole leads to the outside of the filter element, two through holes lead to the inside of the filter element, and the other through hole leads to the water outlet port; and the moving valve disk defines radially one blind recess in the head face thereof from a center to an edge and defines the other blind recess shaped as circular arc around the center in the head face thereof, and the through hole in the moving valve disk permanently opens to the water inlet port and by rotating the moving valve disk, the through hole and the blind recesses in the moving valve disk are aligned with corresponding holes in the fixed valve disk for forming different liquid flow channels for realizing control of a flow and the through hole and the blind recesses in the moving valve disk and the plurality of through holes in the fixed valve disk are allocated on a same turning circle.

* * * * *